United States Patent [19]

Webjorn et al.

[11] Patent Number: 5,875,053
[45] Date of Patent: Feb. 23, 1999

[54] PERIODIC ELECTRIC FIELD POLED CRYSTAL WAVEGUIDES

[75] Inventors: Jonas Webjorn, Santa Clara; Robert G. Waarts, Fremont; Derek Nam, Sunnyvale; Donald R. Scifres, San Jose, all of Calif.

[73] Assignee: SDL, Inc., San Jose, Calif.

[21] Appl. No.: 787,616

[22] Filed: Jan. 23, 1997

Related U.S. Application Data

[60] Provisional application No. 60/010,618 Jan. 26, 1996.

[51] Int. Cl.$^6$ ...................................................... G02F 1/35
[52] U.S. Cl. .................... 359/326; 204/157.15; 204/164; 361/225; 385/122
[58] Field of Search ...................................... 359/326–332; 385/122, 129–131; 361/225; 204/157.15, 164

[56] References Cited

U.S. PATENT DOCUMENTS

| | | | |
|---|---|---|---|
| 3,407,309 | 10/1968 | Miller | 359/328 |
| 5,036,220 | 7/1991 | Byer et al. | 359/328 |
| 5,193,023 | 3/1993 | Yamada et al. | 359/245 |
| 5,382,334 | 1/1995 | Miyaguchi et al. | 361/225 |
| 5,519,802 | 5/1996 | Field et al. | 385/129 |
| 5,615,041 | 3/1997 | Field et al. | 359/326 |
| 5,644,422 | 7/1997 | Bortz et al. | 359/326 |
| 5,734,772 | 3/1998 | Gopalan et al. | 385/122 |
| 5,756,263 | 5/1998 | Gupta et al. | 385/122 |

OTHER PUBLICATIONS

W.K. Burns et al, entitled "Second Harmonic Generation in Field Poled, Quasi–Phase–Matched, Bulk LiNbo$_3$" IEEE Photonics Technology Letters, Feb. 1994, vol.6(2), pp. 252–254.

Jonas Webjö rn et al., entitled "Quasi–Phase–Matched Blue Light Generation in Bulk Lithium Niobate, Electrically Poled via Periodic Liquid Electrodes", Elec. Lett., vol. 30(11), pp. 894–895, May 1994.

J. Webjörn et al. entitled "Electric–field–Induced Periodic Domain INversion in Nd$_3$ —Diffused LiNbo$_3$" Electronics Letters, Dec. 8, 1994, vol. 30 (25), pp. 2135–2136.

Feisst et al. entitled "Current Induced Periodic Ferroelectric Domain Structures in LiNbO$_3$Applied for Efficient Nonlinear Optical Frequency Micing" Appl. Phys. Lett 47(11) Dec. 1985, pp. 1125–1127.

Feng et al. entitled "Enhancement of Second–Harmonic Generation in LiNbO$_3$ Crystals with Periodic Laminar Ferroelectric Domains" Appl. Phys. Lett., vol. 37(1), pp. 607–609, Oct. 1980.

Ito et al. entitled "Fabrication of Periodic Domain Grating in LiNbO$_3$ by Electron Beam Writing for Application of Nonlinear Optical Processes" E;ectronic Lett., Jul. 4, 1991, vol. 27(14) pp. 1221–1222.

Kewitsch et al. entitld "Turnable quasi–Phase Matching Using Dynamic Ferroelectric Domain Grating Induced by Photorefractive Space–Charge Fields" Appl. Phys. Lett., vol. 64(23), Jun. 6, 1994, pp. 3068–3070.

(List continued on next page.)

*Primary Examiner*—John D. Lee
*Attorney, Agent, or Firm*—W. Douglass Carothers, Jr.

[57] ABSTRACT

Several embodiments are described for induced electric field or E-field poling of QPM nonlinear crystal materials, such as LiNbO$_3$, LiTaO$_3$ and KTP, utilizing approaches which, for the most part, avoid the necessity of depositing or otherwise forming a series of spatially disposed conductive electrodes on one surface of the nonlinear crystal material. E-field poling is accomplished by applying a high voltage electric field in excess, for example, in the range of several kilovolts per cm to several 100 kilovolts per centimeter, at room temperature to provide inverted domains in a pattern of continuously alternating domains corresponding to the regions formed on the first z surface of the crystal. The employment of single, planar-applied liquid electrodes is preferred eliminating any necessity of forming and removing previously formed metal electrodes in the poling process.

88 Claims, 9 Drawing Sheets

OTHER PUBLICATIONS

Nazarathy et al. entitled "Spread–Spectrum Nonlinear–Optical Interactions: Quasi–Phase Matching with Pseudorandom Polarity Revrsals" Optics Letters, Oct. 1987, vol. 12(10), pp. 823–825.

Mizuuchi et al entitled "Harmonic Blue Light Generation in Bulk Periodically Poled $LiTaO_3$" Appl. Phys. Lett., May 29, 1.995, vol. 66 (22), pp. 2943–2945.

Ka–Kha Wong entitled "Integrated Optical Waveguides and Devices Fabricated by Proton Exchange: A Review", SPIE–Proceddings of Integrated Optical Circuit Engineering VI (No month 1988), vol. 993, pp. 13–25.

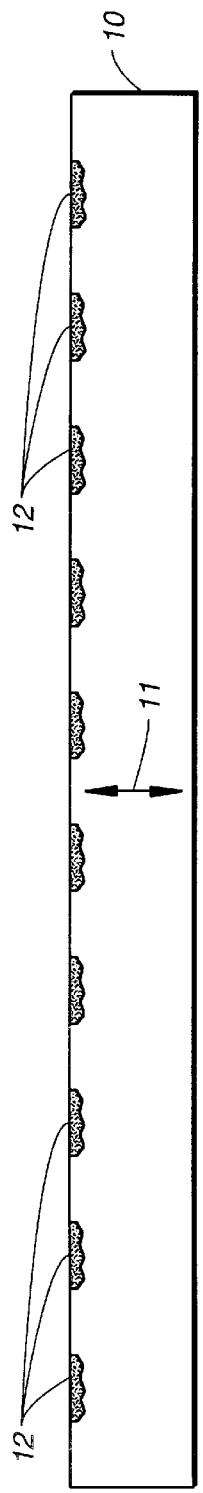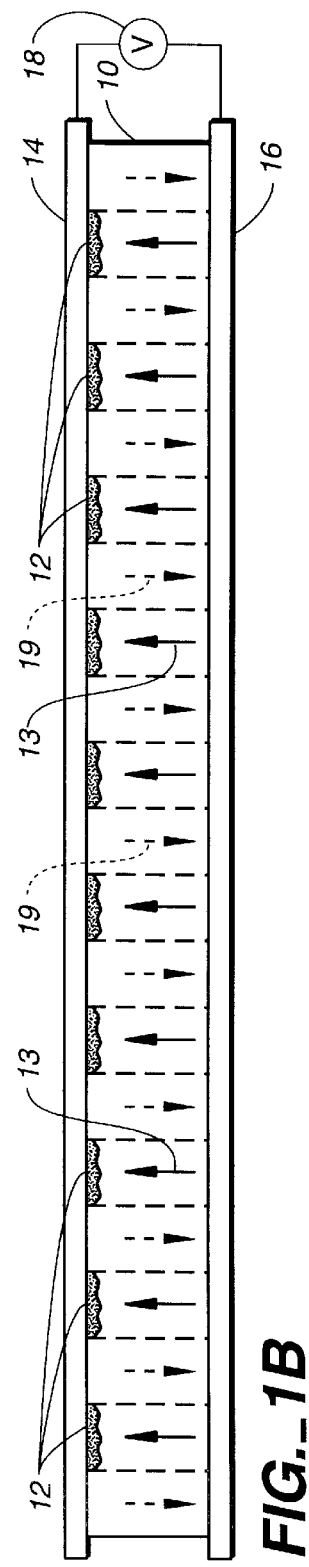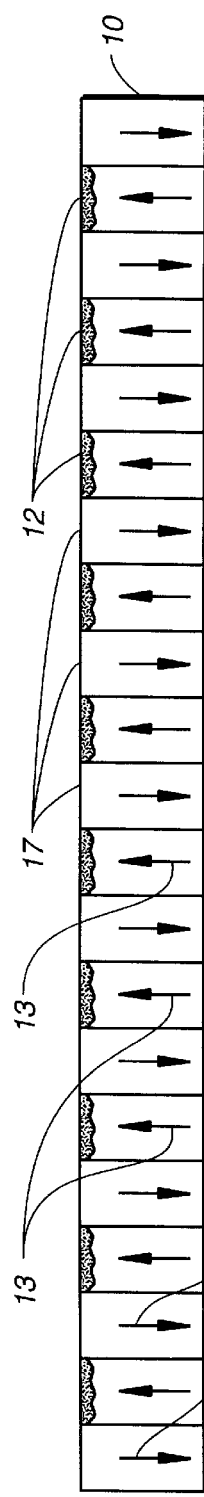

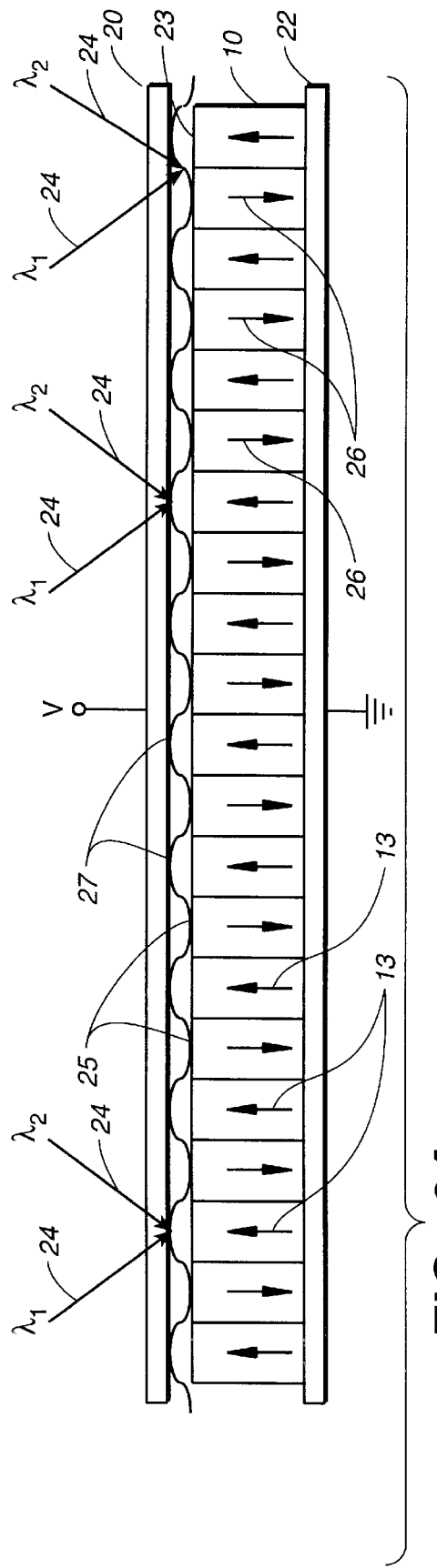
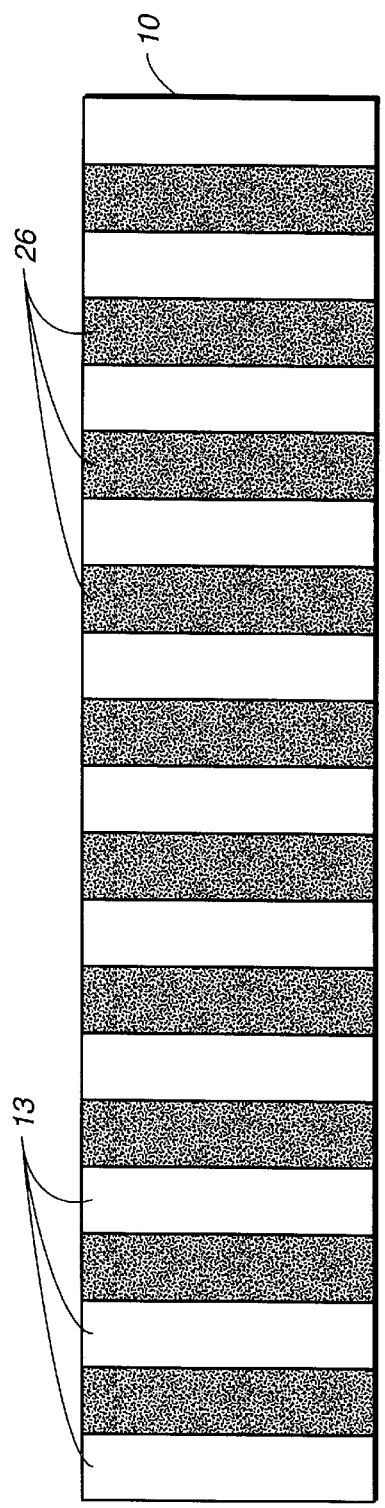
FIG._2A
FIG._2B

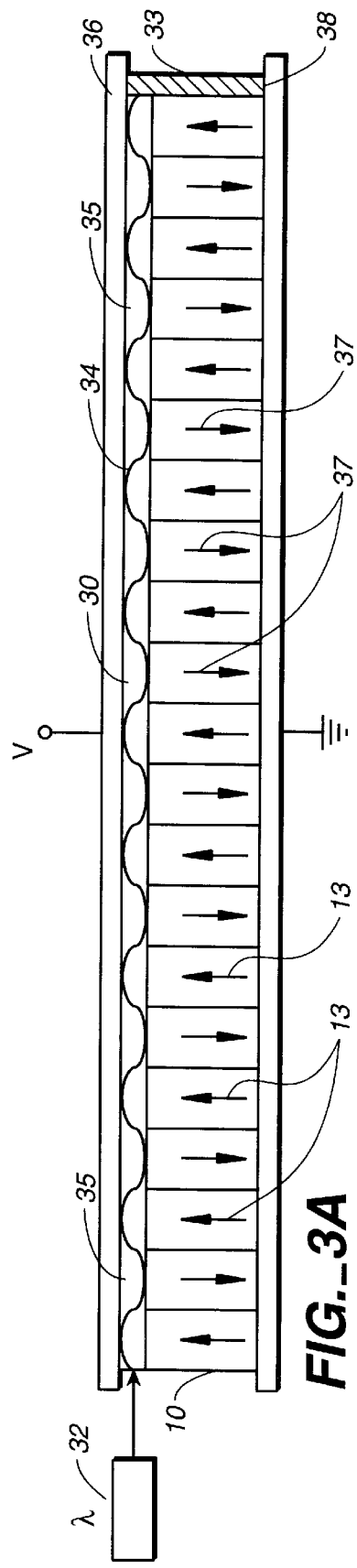
FIG._3A
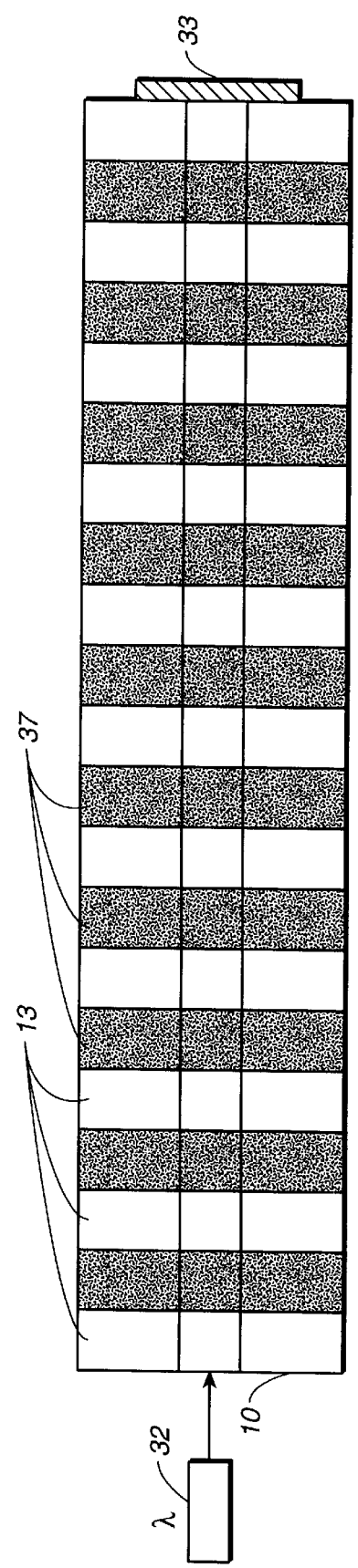
FIG._3B

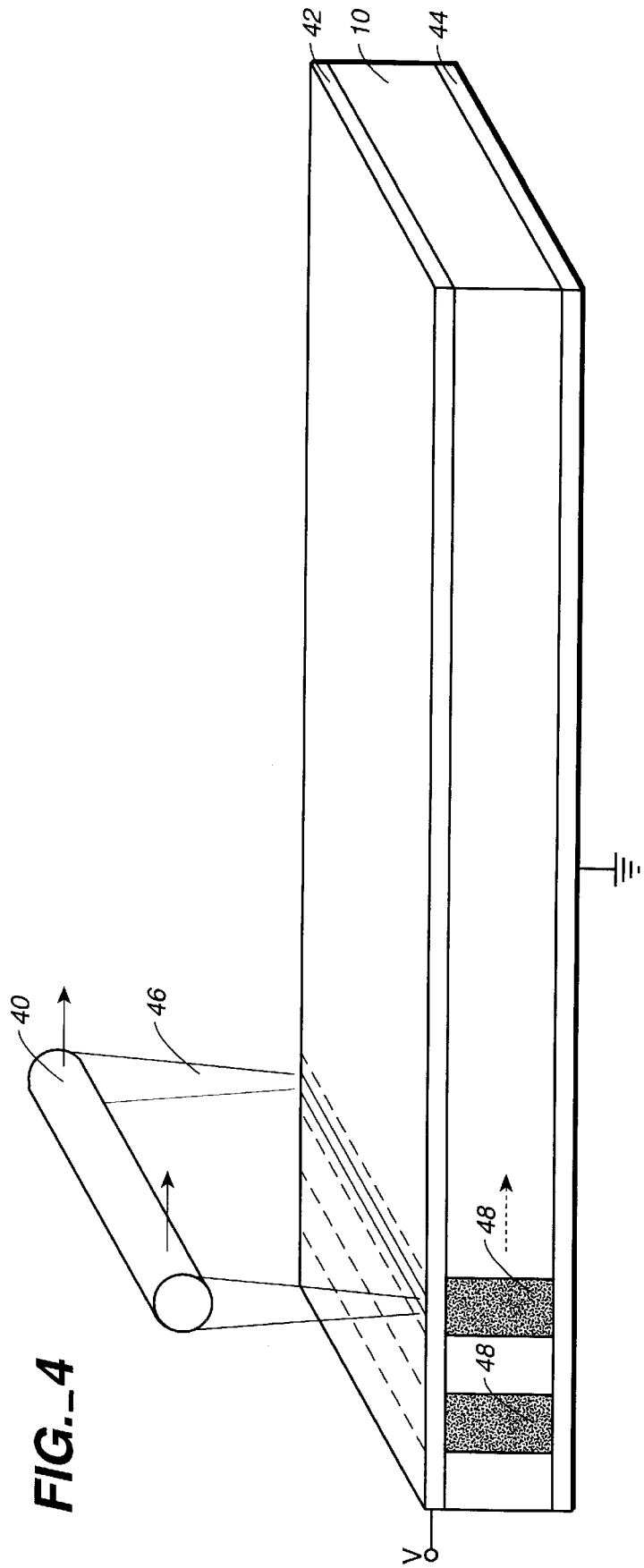
FIG._4

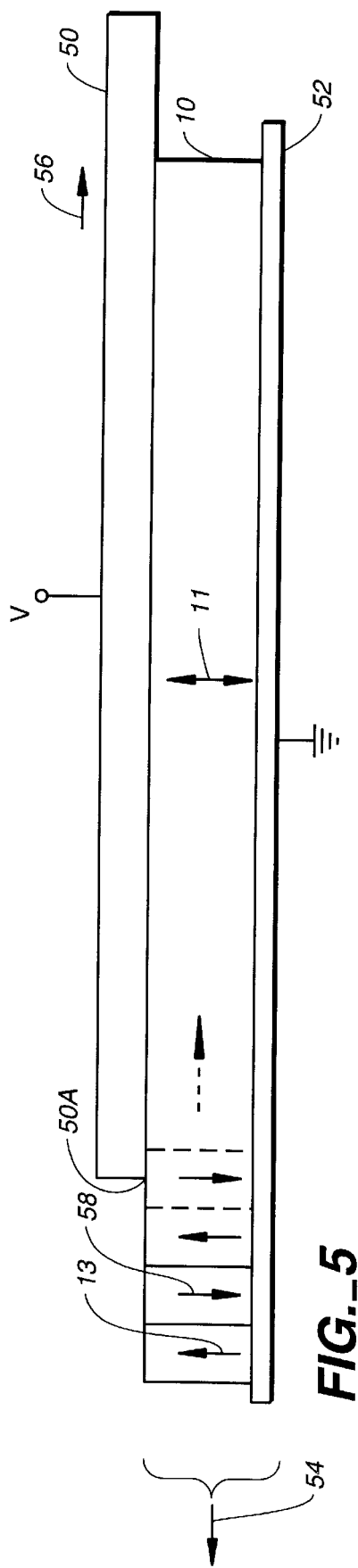
FIG._5
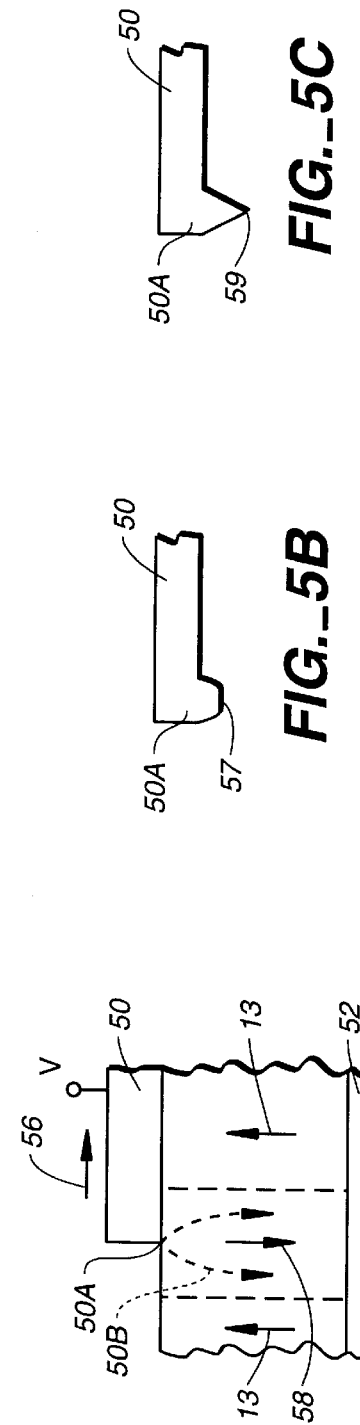
FIG._5C
FIG._5B
FIG._5A

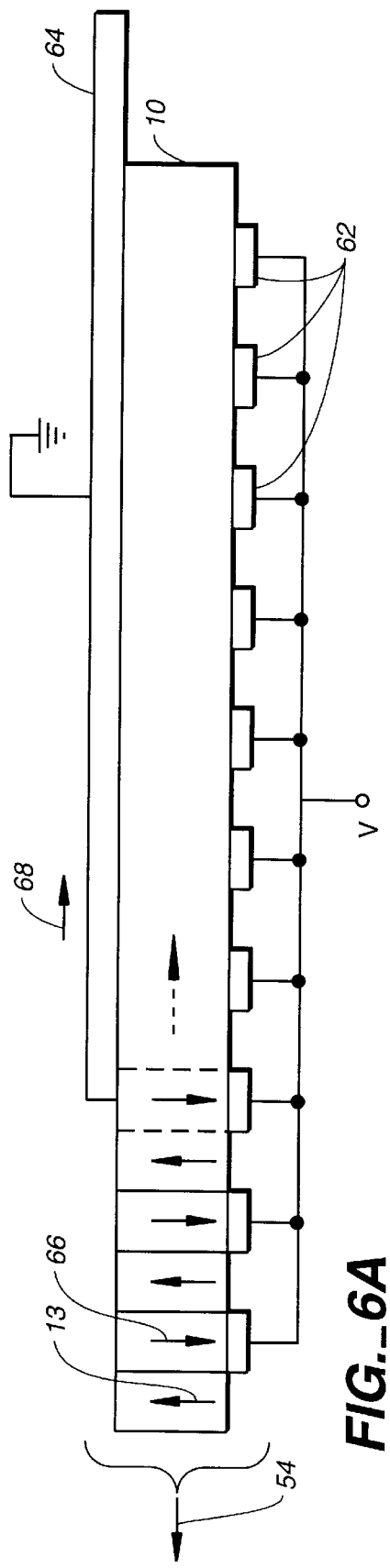
FIG._6A
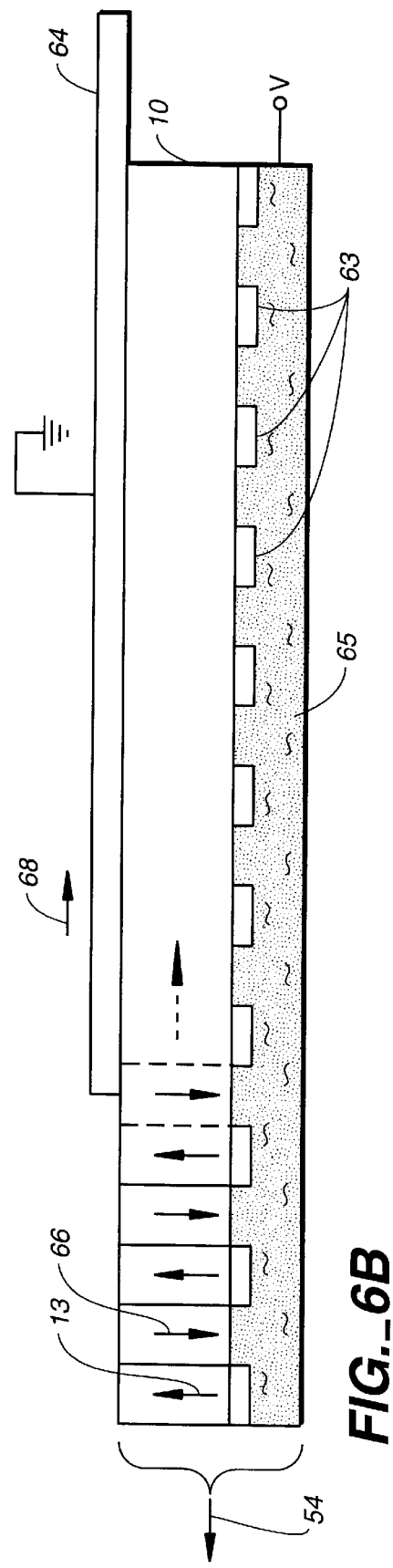
FIG._6B

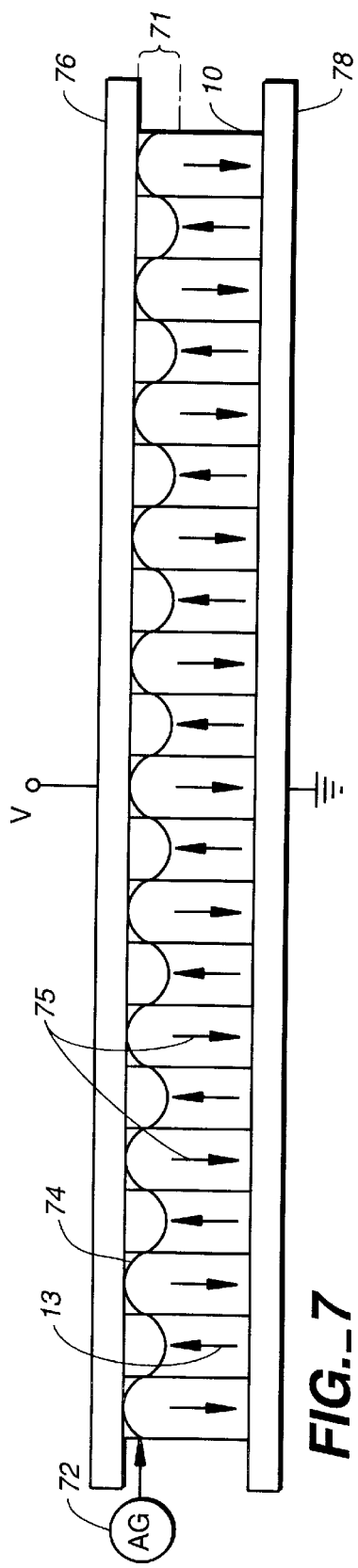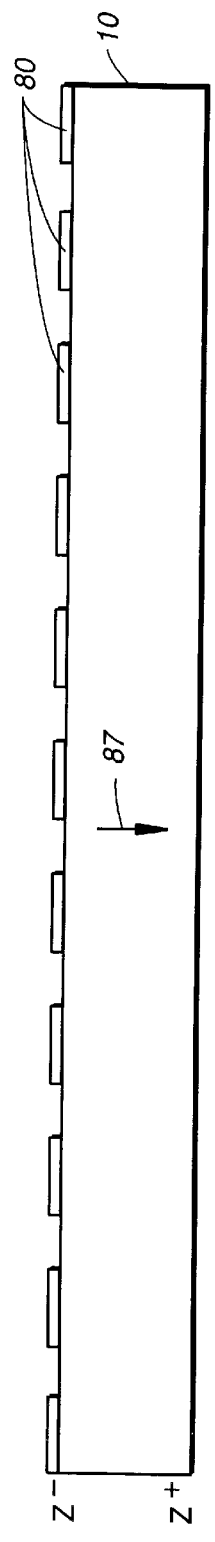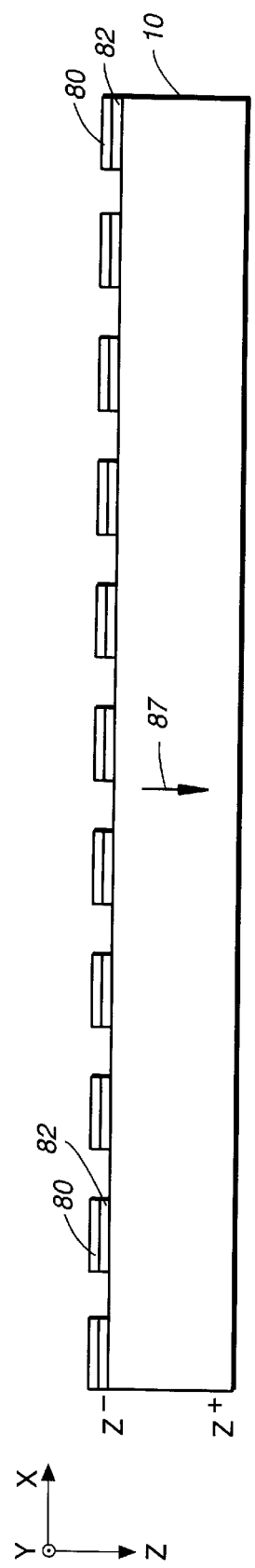
FIG._7  FIG._8A  FIG._8B

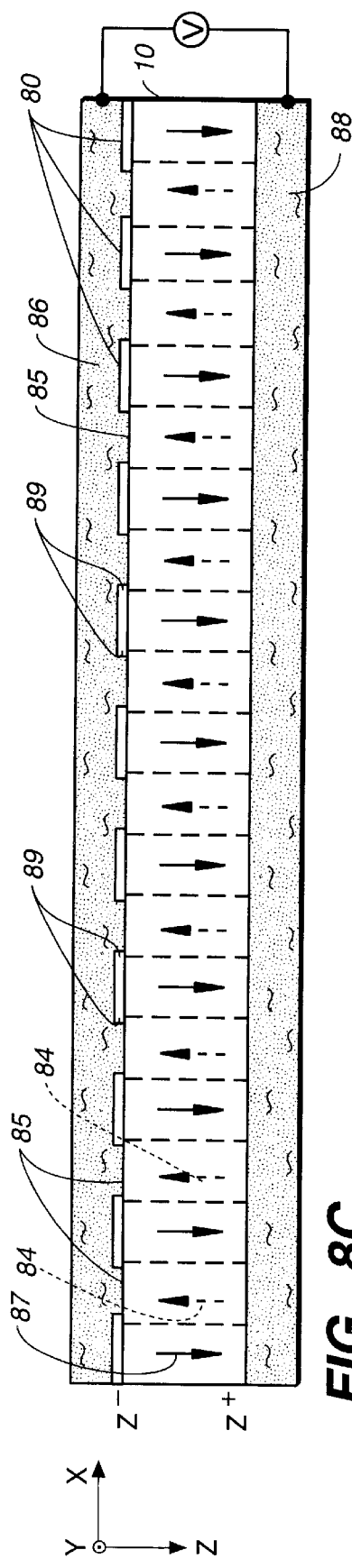
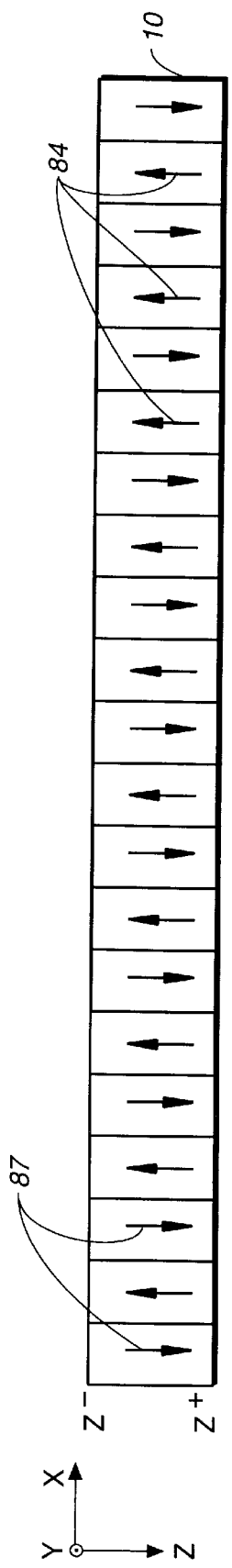
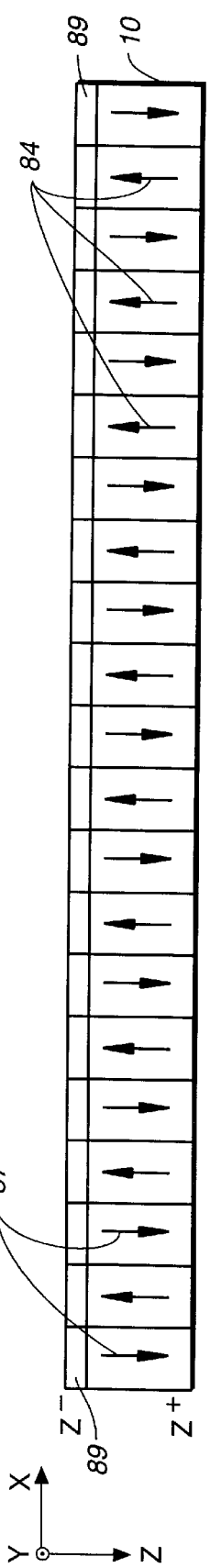
FIG._8C  FIG._8D  FIG._8E

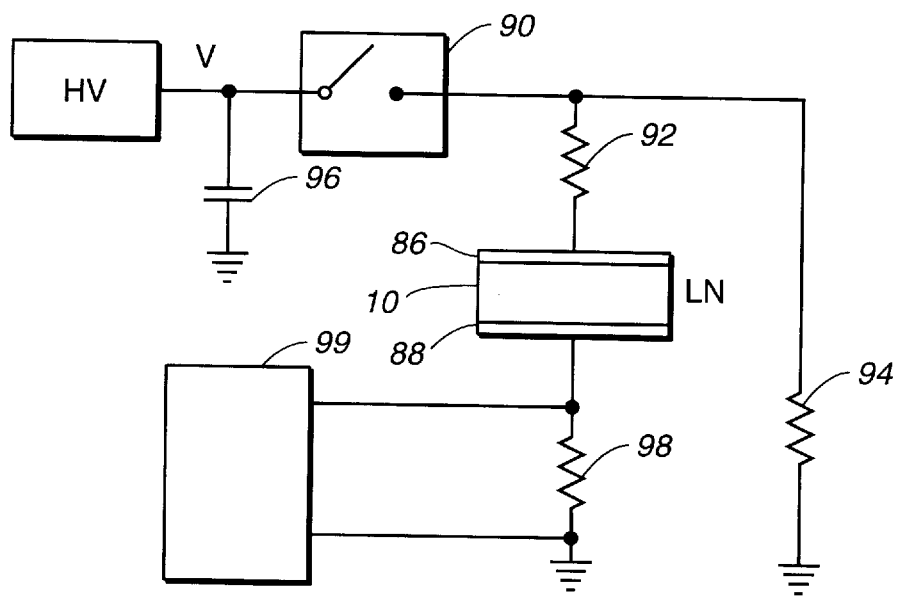
FIG._9
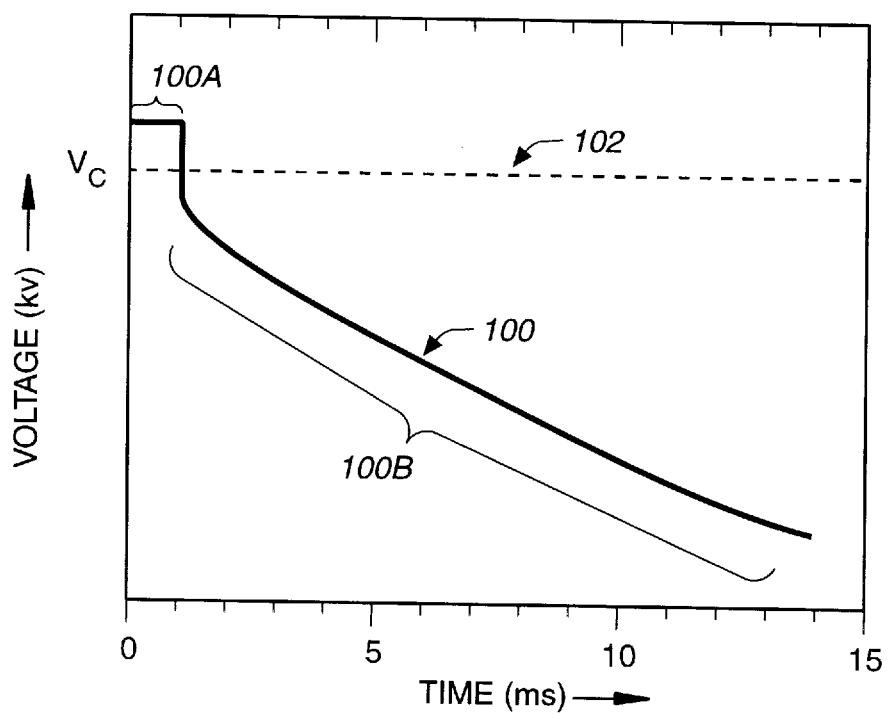
FIG._10

PERIODIC ELECTRIC FIELD POLED CRYSTAL WAVEGUIDES

CROSS REFERENCE TO RELATED APPLICATION

This application is a continuation application of provisional application Ser. No. 60/010,618, filed Jan. 26, 1996.

FIELD OF THE INVENTION

This invention relates generally to the fabrication of periodic poled crystals, such as $LiNbO_3$, $LiTaO_3$ and KTP, for forming nonlinear waveguides and more particularly to electric field or E-filed poling of such crystals to achieve quasi-phase matching (QPM) periodic poling patterns in the crystal.

BACKGROUND OF THE INVENTION

There has been much work for providing frequency conversion of the output from presently available laser diode sources to produce wavelengths not readily available from these sources. The most attractive alternative for frequency conversion, such as frequency doubling, sum frequency generation and difference frequency generation, is quasi-phase matching (QPM) of an input radiation beam or beams from a laser diode source and their harmonic waves in second order optical crystals, such as inorganic crystals $LiNbO_3$, $LiTaO_3$ and KTP as well as in organic materials, such as polymeric mediums. In the case of such crystals, the QPM conditions must be satisfied between the interacting waves in order to achieve efficient nonlinear optical interaction. QPM allows interactions between lightwaves or radiation polarized such that the nonlinearity is maximized and allows interactions to occur in the crystal for which birefringent phase matching is not possible. Compared to birefringent phase matching, QPM allows both access to new wavelengths and higher conversion efficiencies. Since the refractive index of the crystal is dependent upon wavelength of the light to be converted, it is necessary to provide a periodic inverted domain structure within the crystal so as to have domains in the crystal of nonlinear optical coefficient of periodic inverted sign, e.g., two or more regions or domains of different states of ferroelectric polarization transverse to the path of light to be converted. First order QPM requires sign reversals of the effective nonlinear coefficient with a period equal to two coherence lengths. The light waves produced by the nonlinear polarization periodic pattern in the crystal are in phase at the given wavelength so that the waves intensify each other. In particular, QPM allows nonlinear interactions between waves polarized on the z axis for which the maximum nonlinear coefficient or tensor, $d_{33}$, is utilized.

To date, the frequency conversion that is highly desirable is that which generates visible light in the "blue" radiation spectrum, such as wavelengths in the range of about 390 nm to 492 nm, which has many applications such as in color display devices, color projectors and color printers.

In practice, the ability to create finely spaced domains with sufficiently accurate periodicity and well defined domain walls in the crystal is a challenging, if not difficult, task to accomplish, particularly on a continuous yield basis. One of the earliest U.S. patents in the field of applying an electric field is the patent to R. C. Miller, U.S. Pat. No. 3,407,309, which issued in October, 1968.

So far, there are presently several ways to form the periodic domain pattern of desired spontaneous polarization in the nonlinear crystal, i.e., processing regions or domains having a ferroelectric polarization direction that is dominant over all other possible directions. These several ways may be classified, in part, as (1) inverted domain patterns of differing composition, i.e., by surface impurity diffusion or by ion exchange, (2) inverted domain patterns of same composition, i.e., electric field treatment with or without heat, and (3) inverted domains through periodic modulation during crystal growth, i.e., current bias or temperature fluctuation treatment during crystal growth (e.g., by a modified Czochralski process) and (4) electron beam treatment.

An example of the first type of classification is U.S. Pat. No. 5,036,220, now reexamination certificate B1 5,036,220. The first type of classification is generally achieved by the introduction into or by the removal of material from the solid body of the crystal. A most common example is titanium (Ti) diffusion through the $z^+$ surface of the crystal. The resulting inverted domain pattern is generally only possible in a shallow surface layer and does not provide good vertical wall boundaries in the crystal.

Examples of the second type of classification is U.S. Pat. Nos. 3,407,309 and 5,193,023 and the article W. K. Burns et al., entitled "Second Harmonic Generation in Field Poled, Quasi Phase Matched, Bulk $LiNbO_3$", *IEEE Photonics Technology Letters,* Vol. 6(2), pp. 252–254, February, 1994. The second type of classification is generally achieved by the application of a high voltage, electric field through the employment of a pattern of electrodes formed on one major surface of the crystal with a planar electrode formed on the opposite major surface of the crystal forming the opposing field electrode. The applied field is pulsed or cw for a short period of time and is generally accompanied with an applied temperature such as above 100° C. The permanent inversion of the domains is accomplished by means of minute changes in ions in the unit lattice of the crystal due to the application of the electric field. By "permanent", what is meant is that the inverted domain pattern will remain as long as the crystal is not subsequently reheated to high temperature near the Curie temperature of the crystal or subjected to any further high voltage fields.

In about 1963, R. C. Miller recognized that inverted domains could be formed in ferroelectric crystals by cycling an applied electric field to switch the spontaneous polarization of the crystal to form inverted domains. U.S. Pat. No. 5,193,023 teaches periodic poling, using a pattern of electrodes on one side of a crystal and a planar electrode on the opposite side of the crystal across which an electric field is applied. In the examples of U.S. Pat. No. 5,193,023 where an electric field is employed, poling is accomplished in an atmosphere containing oxygen with an applied temperature in the range of 150° C. to 1200° C. and an applied voltage field of several hundreds of volts per centimeter or less.

The field inversion in U.S. Pat. No. 5,193,023 is accomplished at relatively lower applied voltages, such as at several hundreds of volts per centimeter (or several kilovolts per centimeter when using pulse voltages) or less, since the crystal is heated to a sufficiently high temperature during the applied E-field process. However, higher voltages can be successfully employed at room temperature, as demonstrated in the articles of Jonas Webjorn et al., Quasi-Phase-Matched Blue Light Generation in Bulk Lithium Niobate, Electrically Poled via Periodic Liquid Electrodes, *Electronic Letters,* Vol. 30(11), pp. 894–895, May 26, 1994 and "Electric Field Induced Periodic Domain Inversion in $Nd^{3+}$-Diffused $LiNbO_3$", *Electronic Letters,* Vol. 30(25), pp. 2135–2136, Dec. 8, 1994, which are incorporated herein by reference. This second type of classification, particularly as illustrated in U.S. Pat. No. 5,193,023, has also been discounted by others in the past due to problems of electrodiffusion or due to electrode contamination and migration of electrode contaminants into the crystal during the application of an applied high volt-3 age field. However, the employment of liquid electrodes can help avoid such problems, as disclosed in the articles of Jonas Webjorn et al., supra.

Examples of the third type of classification are, respectively, the articles of A Feisst et al., "Current Induced Periodic Ferroelectric Domain Structures in LiNbO$_3$ Applied for Efficient Nonlinear Optical Frequency Mixing", *Applied Physics Letters*, Vol. 47(11), pp. 1125–1127, Dec. 1, 1985 and Duan Feng et al., "Enhancement of Second Harmonic generation in LiNbO$_3$ Crystals With Periodic Laminar Ferroelectric Domains", *Applied Physics Letters*, Vol. 37(1), pp. 607–609, Oct. 1, 1980.

An example for the fourth type of classification is the article of H. Ito et al., "Fabrication of Periodic Domain Grating in LiNbO$_3$ by Electron Beam Writing for Application of Nonlinear Optical processes", *Electronic Letters*, Vol. 27(14), pp. 1221–1222, Jul. 4, 1991.

Of all of the foregoing classifications, the second type of classification has been found the most successful from the standpoint of providing periodic domains that have accurate periodicity and substantially vertically formed domain walls creating the nonlinear periodic waveguide in the crystal. The use of the applied electric field permits the formation of domains that have accurate periodicity and the domains are formed through the crystal forming domain walls that have some parallelism with the z axis of the crystal. However, in the case of the second type as well as all other types classified, the processing only provides for shallow domain structures that do not effectively extend through the crystal bulk and do not form vertical wall boundaries for the formed inverted domains substantially parallel with the z axis of the crystal. What is needed are high voltage processes that are room temperature applicable that provide for vertically formed domain walls that extend in the z axis direction through the crystal bulk without walkoff, i.e., capable of providing bulk frequency conversion, forming highly uniform periodicity, laterally extending domain patterns which achieve first order intervals over long crystal interaction lengths.

Therefore, it is an object of this invention to provide a nonlinear frequency waveguide converter that is fabricated by electric field poling at room temperature.

It is another object of this invention to provide for highly uniform periodicity, laterally extending domain patterns in ferroelectric crystal materials having first order interval capability over long crystal interaction lengths.

Another object of this invention is the provision of a process for high voltage field poling at room temperature of a ferroelectric crystal material useful for bulk frequency conversion.

SUMMARY OF THE INVENTION

According to the foregoing objects of this invention, periodic electric field induced poling is accomplished for ferroelectric crystals, such as LiNbO$_3$, LiTaO$_3$ and KTP, to form nonlinear waveguides in the output for lightwave frequency conversion applications.

According to this invention, a method of forming inverted domains in a nonlinear ferroelectric crystal is carried out by forming spatially disposed, conductive regions on a first z surface of the crystal that replicates the periodicity desired for the inverted domains to be formed, forming a conductive region on a second z surface of the crystal and applying a high voltage electric field in excess, for example, in the range of several kilovolts per centimeter to several 100 kilovolts per centimeter, at room temperature to provide inverted domains in a pattern of continuously alternating domains corresponding to the regions formed on the first z surface of the crystal. The patterning of the first z surface and E-field application to form the inverted domains may be accomplished in several different ways. One such way is by sensitizing regions of the crystal to be unaffected by E-field poling. Another approach is the employment of a photovoltaic type of reaction with an applied E-field, the reaction established with either an applied wavelength radiation beam or through an interference pattern established with at least two applied wavelength radiation beams. Another approach is the employment of a stepped edge electrode in combination with either planar electrodes, or patterned electrodes or patterned masking. Another approach is the employment of an applied acoustic field to set up a poling pattern and application of an applied E-field. The preferred approach is the application of an applied E-field through the employment of a spatially disposed insulator pattern on the crystal z$^-$ surface over which a liquid electrode is applied and a planar liquid electrode is applied to the crystal z$^+$ surface. The types of patterning that are disclosed, substantially in all cases, do not rely on a plurality of spatially disposed conductive electrodes to be the primary basis for forming a given electrode pattern. The employment of planar-applied liquid electrodes is preferred eliminating any necessity of removing previously deposited metal electrodes.

Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 1A–1C are a schematic illustration of a first embodiment of this invention for forming a periodic poled ferroelectric crystal by providing a pattern of desensitized, non-invertable regions on one of the z-axis surfaces and employing planar electrodes on opposite z surfaces with an applied electric field.

FIGS. 2A and 2B are schematic illustrations of a second embodiment of this invention for forming a periodic poled ferroelectric crystal using principles of optical interference and an applied electric field.

FIGS. 3A and 3B are schematic illustrations of a third embodiment of this invention for forming a periodic poled ferroelectric crystal using principles of optical standing wave pattern and an applied electric field.

FIG. 4 is a schematic illustration of a fourth embodiment of this invention for forming a periodic poled ferroelectric crystal using principles of optical heating and an applied electric field.

FIG. 5 together with more detail FIGS. 5A–5C are schematic illustrations of a fifth embodiment of this invention for forming a periodic poled ferroelectric crystal employing a stepped edge electrode and an applied electric field.

FIGS. 6A and 6B are schematic illustrations of a sixth embodiment of this invention for forming a periodic poled ferroelectric crystal employing a stepped edge electrode respectively with an electrode pattern or an insulator pattern and an applied electric field.

FIG. 7 is a schematic illustration of a seventh embodiment of this invention for forming a periodic poled ferroelectric crystal employing an applied acoustic field and an applied electric field.

FIGS. 8A–8E are a series of schematic illustrations of an eighth embodiment of this invention showing the steps employed to produce a frequency conversion device by means of high voltage E-field induced poling using liquid electrodes and a spatial insulator pattern applied to one of z surfaces of the crystal.

FIG. 9 is a schematic of an electrical circuit to accomplish the electric field poling according to this invention.

FIG. 10 is a graphic illustration of the applied voltage over time to accomplish the electric field poling in accordance with the electrical circuit shown in FIG. 9.

DESCRIPTION OF THE PREFERRED EMBODIMENTS OF THE INVENTION

I. Periodic Electric Field Poling Using Planar Electrodes

Reference is made to FIGS. 1–6 disclosing alternative means and methods for forming periodic poled ferroelectric crystals. Several basic alternatives are disclosed. FIGS. 1A–1C discloses an approach where a pattern of regions is formed that are non-effected by an applied electric field, i.e., they are desensitized to an applied electric field thereby providing for poling regions between the non-invertable regions to form the periodic inverted domains. Periodic or spatially disposed metal electrodes for applying the electric field need not be formed and later removed from the z axis surface of the crystal plate. FIGS. 2–4 disclose approaches where a pattern of inverted domains is formed by means of radiation application employing a photovoltaic type of reaction. FIGS. 5 and 6 disclose approaches where a pattern of inverted domains is formed by means of a stepped edge electrode in combination with either planar electrodes, or patterned electrodes or patterned masking. The approaches of FIGS. 1 and 5 may be combined as a further alternative poling approach. FIG. 7 discloses an approach where a pattern of inverted domains is formed by means of an applied acoustic field. Finally, FIGS. 8A–8F disclose an approach where a pattern of insulator regions is formed over which a single liquid electrode is applied to form inverted domains between the insulator regions.

With the exception of FIG. 6A embodiment, all embodiments of FIGS. 1–8 employ planar electrode configurations so that there is no necessity in the practice of this invention to provide a given conductive electrode pattern on either of the major z surfaces of the ferroelectric crystal to be E-field poled.

With reference to the description in connection with each of the embodiments, a three-axis coordinate system is utilized to render clearly the described directions in the accompanying description of the embodiments. Relative to a linear frequency conversion device, this orientation is as follows. The longitudinal direction (x axis) is the direction of propagating radiation within the fabricated waveguide or waveguide bulk of the nonlinear crystal. The lateral direction (y axis) is perpendicular to the longitudinal direction, extends in a horizontal direction and is parallel with the elongated extent of the inverted domains. The transverse direction (z axis) is perpendicular to the longitudinal direction, extends in a vertical direction and is along the z crystal axis of the crystal bulk. The x, y, z coordinates are shown in connection with the figures, as referenced in the following described embodiments.

Reference is now made to FIGS. 1A to 1C illustrating a first embodiment of this invention. In FIG. 1A, there is shown a ferroelectric crystal plate 10, such as $LiNbO_3$, $LiTaO_3$ and KTP having a uniform spontaneous polarization direction indicated by arrow 11 along or parallel with the z axis of the crystal. The double-headed arrow, therefore, means that the direction of spontaneous polarization could lie initially in either direction. In order to create regions or domains of opposite signs of nonlinear coefficients, periodic non-invertable regions 12 matching the desired periodicity are formed in crystal plate 10, i.e., they form a pattern which is usually periodic with a period corresponding to two times the coherence length of the nonlinear optical interaction for the frequency conversion application for which crystal plate 10 is intended. Regions 12 affect the crystal such that these are non-invertable in polarization. To be noted is that the vertical bulk thickness below regions 12 is prevented from spontaneous polarization changes either because these regions have already been inverted previously to have a different spontaneous polarization, or because they are rendered to have no spontaneous polarization (i.e., are paraelectric). Regions 12 are achieved through various treatment approaches, such as by proton exchange, diffusion, heavy ion implantation or by rendering at least the surface areas of these regions in an amorphous state. An example of a dopant to inhibit such domain reversal in regions 12 may be the diffusion of Ti, Mg or Zn.

After formation of regions 12, planar electrodes 14 and 16 are applied to opposite major z surfaces of crystal plate 10, as illustrated in FIG. 1B. These electrodes are preferably liquid electrodes applied to the major z surfaces of ferroelectric crystal plate 10, as taught in the article of Jonas Webjorn et al., Quasi-Phase-Matched Blue Light Generation in Bulk Lithium Niobate, Electrically Poled via Periodic Liquid Electrodes, *Electronic Letters,* Vol. 30(11), pp. 894–895, May 26, 1994, which is incorporated in this disclosure by reference thereto. Filter paper is soaked with a solution of LiCl in water and is pressed onto the surfaces of the crystal over the formed non-invertable regions 12. The electrodes are maintained in position with plate 10 by means of clamping, and a high voltage is applied across liquid electrodes 14, 16 such as by means of the circuit shown in FIG. 9, which circuit will be explained in greater detail later. Typically, high voltage pulses are applied to the electrodes, such as from one 1 to 10 such pulses, each having a duration, for example, in the range of between about 0.1 ms to about 10 ms. The operation is carried out at preferably room temperature because of ease of manufacture and, in any case, around room temperature (i.e., between 1° C. and 100° C.) and the applied poling voltage may be in the range of 500 V to 10 kV ( filed strengths of 1 kV/mm to 25 kV/mm) depending upon thickness of crystal plate 10 as well as the particular nonlinear material employed. The induced E-field poling action is indicated in FIG. 1B. The domains of inverted polarization, indicated by arrows 19, grow from one face of the crystal to the opposite face of the crystal. Charge transfer through the non-inverted regions 12 is not possible so that inverted domains beneath these regions are prevented from being created and remain with their original spontaneous polarization as indicated by arrows 13. The result from E-field poling is illustrated in FIG. 1C wherein regions 19 of crystal plate 10, not sensitized to non-invertable spontaneous polarization are inverted forming periodic inverted domains 17 having opposite spontaneous polarization as indicated by arrows 19. Crystal plates 10 formed with regions that are inverted entirely through the crystal bulk can be utilized for both bulk or waveguide nonlinear optics applications. If the preparation of non-inverted regions 12 cause some undesirable changes to portions of the crystal refractive index or to its nonlinearity properties, the longitudinal waveguide structure, formed along the longitudinal direction, can be alternatively created in the opposite major face of the crystal.

Reference is now made to the second embodiment of this invention illustrated in FIGS. 2A and 2B. Crystal plate 10 is provide with two planar electrodes wherein planar electrode 20 is a transparent electrode, such as ITO, and planar electrode 22 may be a liquid electrode as in the case of electrodes 14, 16 in FIG. 1B. An optical field is established comprising two collimated beams of light, for example, two laser beams $\lambda_1$ and $\lambda_2$, which are introduced through transparent electrode 20 in an angular relationship to form an interference pattern at the surface in the z plane of crystal plate 10. The two interfering beams $\lambda_1$ and $\lambda_2$ form an optical illumination on the top surface 23 of plate 10 which is sinusoidal in one direction, i.e., the x direction, and forms optical variation line intensities in the y direction so that some regions 25 of the beam on surface 23 will interfere additively thereby heating up the surface to a greater extent than regions 27 where the two beams interfere destructively. The locally additive optical fields at 25 introduce local heating which locally enhances E-field poling thereby creating a periodically poled crystal when the high voltage field is applied to crystal plate 10 via planar electrodes 20 and 22. This technique of induced poling by employment of an optical interference pattern is also disclosed in the article of Anthony S. Kewitsch et al., entitled, "Tunable Quasi-Phase Matching Using Dynamic Ferroelectric Domain Gratings Induced by Photorefractive Space-Charge Fields", *Applied Physics Letters,* Vol. 64(23), pp. 3068–3070, Jun. 6, 1994, which is incorporated herein by reference thereto. Pulsing of the optical interfering illumination will further provide for better temperature modulation. Alternatively, a hologram or other phase mask may be employed to periodically change or vary the sinusoidal illumination to provide for other optical beam surface interference patterns, such as a square wave modulation pattern. As a further alternative, a thin top black stripe pattern comprising a plurality of spatially disposed black strips of light absorbing material may be formed on surface 23, with the stripes extending parallel with the transverse direction, to coincide with the formed optical interference pattern for improving the thermal gradient established at surface 23.

Upon establishment of interference pattern 24, E-field poling is applied to plate 10 by the application of a high voltage across the plate, such as by means of the circuit shown in FIG. 9, to form inverted domains 26. Typically, high voltage pulses are applied to the electrodes, such as from about one 1 to 10 such pulses each having a time duration in the range between about 0.1 ms to about 10 ms. The operation is carried out at room temperature and the applied poling voltage is in the range of 4 kV to 10 kV depending, in part, upon thickness of crystal plate 10. The domains of inverted polarization grow from one face of the crystal to the opposite face of the crystal. In the case of employing a pulsed optical interfering illumination pattern, the high voltage may be pulse synchronized with pulsation of the applied interfering optical field 24.

Reference is now made to the third embodiment of this invention shown in FIGS. 3A and 3B. In this embodiment, the pattern of periodic inverted domains is established by forming a standing optical wave along a bulk surface portion 30 of crystal plate 10. As shown in FIG. 3A, a mirror surface 33 is formed at an opposite end of plate 10. Mirror 33 may be a deposited metal layer or a plurality of deposited layers to form a high reflecting surface highly reflective of wavelength, $\lambda$, of light reflected. Different wavelengths, $\lambda$, will provide for different periods of standing waves and, correspondingly, different periods of poled domains. Laser 32 is focused at the other end of plate 10 through surface region 35 of plate 10, and the reflected light from mirror 33 forms a periodic standing wave pattern 34 in region 35. As in the case of the previous embodiment, the pattern is sinusoidal in one direction, i.e., the longitudinal direction, and spatially forms optical variation line intensities in the y direction. However, the standing wave provides a pattern that affects the distribution of the applied high voltage field. A high voltage is applied in manner as explained in connection with the two previous embodiments, via planar, full surface electrodes 36 and 38, which may be liquid electrodes. Crystal plate 10 is, then, poled corresponding to the periodicity of the optical standing wave pattern 34. As a result, inverted domains 37, i.e., having inverted spontaneous polarization, are created according to optical standing wave pattern 34 corresponding to the desired nonlinear conversion pattern.

Reference is now made to the fourth embodiment of this invention illustrated in FIG. 4. This embodiment is a variation of the E-field poling embodiment of FIG. 2. Crystal plate 10 is poled through the employment of cylinder lens 40 and planar electrodes 42 and 44 to apply a high voltage to plate 10 such as by means of the circuit shown in FIG. 9. Electrode 42 is a transparent electrode, such as made from ITO. Electrode 44 may be a liquid electrode as disclosed in the embodiment of FIG. 8. An optical beam, such as a collimated beam or laser bar beam, is shaped by cylinder lens 40 to form an optical line source 46 directed into the surface of the z plane of crystal plate 10. The power density in this embodiment is much greater than in the case of the FIG. 2 embodiment since the line beam 46 is focused to a much smaller area along the transverse direction. Lens 40 and its optical power source (not shown) may be on a platform that is stepped across the surface of plate 10 or, alternatively, crystal plate 10 may be stepped to form the inverted domain regions 48 corresponding to the nonlinear pattern to be formed in crystal plate 10.

As in the case of the second embodiment, the optical field may be cw or pulsed to match the pulse period of the applied high voltage electric field. An advantage of this embodiment is that the periodicity of domains 48 and/or the width of domains 48 may be varied across plate 10 in the longitudinal direction to allow for optimization of frequency conversion along the wavelength conversion tuning curve so that efficiency of frequency conversion may be selected as a tradeoff for wavelength bandwidth selection.

Reference is now made to the fifth embodiment of this invention illustrated in FIG. 5. In this embodiment, a periodically poled crystal plate 10 is formed with the employment of electrodes 50, 52 where electrode 50 comprises an electrical conductive material. Counter electrode 52 may be a liquid electrode as in the case of previous embodiments. To accomplish E-field poling, plate 10 along with electrode 52 is moved relative to electrode 50, e.g., planar electrode 50 may be moved relative to plate 10 in the longitudinal direction indicated by arrow 56, in a stepped fashion with a high voltage applied field to form inverted domains 58, or plate 10 with planar electrode 52 may be moved together in the opposite longitudinal direction indicated by arrow 54, in a stepped fashion with a high voltage applied field to form inverted domains 58. In either case, a large electric field is established at the edge 50A of electrode 50 which penetrates the crystal bulk, as illustrated at 50B in Fig, 5A, forming a poled domain 58. Multiple, spatial domains in the x direction are formed by repetition of the stepped movement with the applied field process. Again, the circuit of FIG. 9 may be employed for the E-field poling process. While the edge 50A of electrode 50 is sufficient, a shaped edge may be applied to electrode edge 50A, as illustrated in FIGS. 5B and 5C. In FIG. 5B, a flat planar ridge 57 extending in the transverse direction is formed at electrode edge 50A. In FIG. 5C, a pointed edge 59 extending in the transverse direction is formed at electrode edge 50A.

Reference is now made to FIGS. 6A and 6B which illustrates a sixth embodiment of his invention, which is an alternative to the fifth embodiment of FIG. 5. In FIG. 6A, crystal plate 10 has formed on the surface of the z plane a plurality of conductive stripe electrodes 62 extending in the transverse direction. The pattern of electrodes 62 is formed in a conventional manner employing photolithography. These electrode may be, for example, Al. The pattern period is established according to the desired nonlinear periodicity for crystal plate 10. The poling process utilized is the stepped edge electrode process illustrated in the FIG. 5 wherein electrode 64 is stepped in the longitudinal direction, as indicated by arrow 68, while a pulsed high voltage electric field is applied via the circuit of FIG. 9. To be noted is that the high voltage field is applied from the bottom face of crystal plate comprising, for example, the $z^-$ face, to minimize nucleation of domain sites in regions 66 undergoing polarization inversion. By employing a definitive pattern of electrodes 62, sharp side wall domains can be created through the crystal bulk.

In FIG. 6B, a planar liquid electrode 65 is employed instead of a plurality of conductive electrodes 62. A plurality of insulator regions 63 are formed in a pattern extending in the transverse direction according to the desired nonlinear periodicity for plate 10. Next, a liquid electrode 56 is applied over the surface of patterned insulator stripe regions 63 in the manner as explained in connection with the embodiments of FIG. 8. The poling process utilized is the stepped edge electrode process illustrated in the FIG. 5, wherein electrode 64 is stepped in the y direction, as indicated by arrow 68, while a pulsed high voltage electric field is applied via the circuit of FIG. 9. The high voltage field may be applied from the $z^-$ face of crystal plate to minimize nucleation of domain sites in regions 66 undergoing polarization inversion. By employing a definitive pattern of insulator regions 63, sharp side wall domains can be created through the crystal bulk through the application of liquid electrode 56.

Reference is now made to FIG. 7 illustrating a seventh embodiment of this invention. This embodiment is similar to the third embodiment in that a standing wave 74 is created in the upper region 71 of crystal plate 10. However, the standing wave is not an optical wave derived from an optical source but rather is derived from an acoustical source 72 creating an acoustical standing wave 74 within the crystal boundary of region 71. Acoustical standing wave 74 creates local variations in the total applied electric field along the longitudinal direction through the employment of the piezo-optic effect. Again, the circuit of FIG. 9 may be used to apply the high voltage E-field for poling. The domains of inverted polarization grow from one face of the crystal to the opposite face of the crystal as indicated by arrows 75. The acoustical field may be pulse in synchronization with the pulsation of the applied high voltage field.

In connection with each of the foregoing embodiments as well as the embodiment of FIG. 8, to be described next, it is in the scope of this invention to employ a modulation of the inverted domains in crystal plate 10 that does not possess continuously alternating domains where they have continuous, opposite spontaneous polarization direction. Alternatively, a Barker code modulation of the grating formed may be utilized as taught by Moshe Nazarathy et al. in the article entitled, "Spread-Spectrum Nonlinear Optical Interactions: Quasi-Phase Matching With Pseudorandom Polarity Reversals", *Optical Letters,* Vol. 12(10), pp. 823–825, October, 1987, which is incorporated into this disclosure by reference thereto.

II. Fabrication of Periodic Electric Field Poled Crystals Using Liquid Electrodes Reference is now made to a fabrication process for periodically poled ferroelectric crystals, such as for forming lithium niobate waveguides, with respect to the embodiment shown in FIGS. 8A–8F. The periodic poling is achieved by subjecting a z-cut crystal substrate to high-voltage pulses via the employment of liquid electrodes as set forth in the article of Jonas Webjorn et al., Quasi-Phase-Matched Blue Light Generation in Bulk Lithium Niobate, Electrically Poled via Periodic Liquid Electrodes, *Electronic Letters,* Vol. 30(11), pp. 894–895, May 26, 1994, which is incorporated in this disclosure by reference thereto. First, a $LiNbO_3$ (LN) crystal plate 10, having a common spontaneous polarization direction 87, is prepared for the poling process relative to the $z^-$ surface side. However, process can also easily be carried out from the $z^+$ face. The $z^-$ surface is preferred because it has been found that improved vertical wall domain resolution is achieved with E-field poling through the $z^-$ face rather than the $z^+$ face. First, a fiducial (alignment mark) pattern is formed on the $z^-$ face LN plate 10. The pattern is generally formed along the boundary regions of the plate. The pattern is formed using conventional photolithography techniques employing a photoresist forming exposed fiducial areas which subsequently receive an optically discernible material, such as Ti, which adheres well to the crystal plate surface. The process used to deposit the Ti fiducial pattern may be CVD or by sputtering. After formation of the fiducial pattern, liftoff of the photoresist is accomplished.

Once the fiducial pattern is formed, multiple grating patterns are formed over the $z^-$ face surface of plate 10 with the aid of the fiducial marks since the subsequently formed inverted domains are not optically visible, i.e., the fiducial marks become the guide for the location and placement of the subsequently formed, invisible domain patterns formed in crystal plate 10 using conventional photolithography techniques, as explained below, as well as the location and alignment for the subsequent formation of waveguides within the formed grating pattern boundaries. To be noted that FIGS. 8A–8E illustrate the transverse cross section through only one such grating pattern and resulting domain pattern formed on crystal plate 10.

In the article of K. Mizuuchi et al., entitled "Harmonic Blue Light generation in Bulk Periodically poled $LiTaO_3$", *Applied Physics Letters,* Vol. 66(22), pp. 2943–1945, May 29, 1995, the author's contend that inverted domain nuclei appear on the $z^+$ face during the application of the electric field and the nuclei extend in a broadening manner in both forward and side growth into the crystal bulk. We have found, however, that by applying the patterning to the $z^-$ face of the crystal, this nuclei broadening affect can be somewhat suppressed.

Next, as shown in conjunction with FIG. 8A, a photoresist layer is formed on the $z^-$ face and, employing conventional photolithography techniques with exposure and development, a photoresist pattern 80 is formed on the surface of crystal plate 10 having a periodicity or grating period desired for the inverted domains corresponding to the particular frequency mixing application. The pattern stripes 80 extend in the y direction. The thickness of the formed pattern 80 should be sufficient to prevent dielectric breakdown, which may be, for example, a photoresist thickness in excess of 1 μm. The important point is that the establishment of any field through regions covered by pattern 80 should be maintained below the critical voltage, $V_C$, for bring on inversion of the particular crystal spontaneous polarization. As previously indicated, we have discovered that the patterning of the photoresist layer is preferably accomplished on the z⁻ face of crystal plate 10 because there is less tendency for migration in the x direction of the inversion boundary, due to E-field poling, much beyond the pattern edges of photoresist pattern 80.

Alternatively, a dual layer pattern shown in FIG. 8B may be formed for the purpose of assuring good insulating properties for shielding the non-inverting regions to be formed from the high voltage applied field, at least from being subjected to a field, either cw or pulsed, in excess of the critical voltage, $V_C$, required for a change in spontaneous polarization. Also, the dual layer improves the dielectric strength of the insulator pattern contributing to improvement of the domain pattern formation. In FIG. 8B, the first pattern 82 is of a highly insulating material, such as $SiO_2$, which can be easily deposited by CVD after forming a photoresist pattern with the desired periodicity. The second pattern is photoresist pattern 80 aligned on the first pattern 82.

Once the proper insulator pattern corresponding to the desired grating periodicity has been formed, liquid planar electrodes are prepared and applied to both the z⁻ and z⁺ faces of crystal 10 in the manner described in the above incorporated Jonas Webjorn et al. article. In particular, filter paper is soaked in a solution of LiCl mixed in water and the soaked, conductive paper is applied or pressed onto both the z⁻ and z⁺ crystal surfaces, as illustrated in FIG. 8C, forming liquid conductive electrodes 86 and 88. Thus, the periodicity for the E-field is given by photoresist pattern 80 on the z⁻ face of crystal plate 10. The resist regions 80 insulate the covered portions of crystal 10 from the conductive liquid electrode thereby preventing spontaneous polarization inversion in these regions of the crystal, which regions are indicated at 87 in FIG. 8C.

With the formation of liquid electrodes 86 and 88, the E-field poling is carried out at room temperature employing the high voltage circuit shown in FIG. 9. In reference to FIG. 9, high voltage dc source, HV, is coupled across the liquid electrodes 86 and 88 of LN crystal 10 via solid state switch device 90. Device 90 provides for the application of high voltage pulses to z surface patterned crystal 10 via series resistor 92. The resistance of resistor 94 may be, for example, in excess of 100 MΩ and the capacitance of capacitor 96 may be, for example, 20 nF. Capacitor 96 provides for voltage stabilization on the input side of switch device 90 so that a high voltage with a large current can be delivered to LN plate 10 when switch device 90 is closed. There may also be resistance in parallel with capacitor 96 to dissipate the charge on capacitor 96 when switch device 90 is in an open state or when the poling process is completed in preparation of removal of LN plate from the circuit. The capacitance across LN crystal 10 may be in the range of about 100 pF to 200 pF so that when the applied high voltage is switched off via device 90, the voltage across LN crystal 10 will discharge through resistor 94 permitting safe removal of LN plate 10 from the circuit. This discharge is illustrated in FIG. 10 wherein the application of single poling pulse is shown, although a series of such pulses may be actually applied. The applied voltage must be higher than the critical voltage, $V_C$, which is the voltage required to invert the spontaneous polarization of the particular crystal. In FIG. 10, solid curve 100 is an example of an applied high voltage pulse. As an example, the pulse above $V_C$, is applied for about 1 ms by closure of switch 90, illustrated in FIG. 10 at 100A, after which the pulse is terminated by opening switch 90. The applied time of pulse 100A may be in the range of about 0.1 ms to about 10 ms. Generally, 2 to four or more such pulses may be applied and monitored to determine the extent of inversion with the aid of an monitoring device such as an oscilloscope.

As previously indicated, a high voltage remains across LN crystal 10 because the crystal functions like a capacitor. This voltage is then discharged from crystal 10 through resistor 94, which discharge in a manner illustrated in FIG. 10 at curve portion 100B. Without resistor 94, the discharge would not so occur and the high voltage would remain on LN crystal 10 for a longer period of time before natural decay of the charge on plate 10. The resistance of resistor 94 should be large enough so that the decay voltage on the crystal allows inverted domains 84 to stabilize in their induced spontaneous polarization state.

As a particular example of frequency mixing elements, crystal plate 10 of $LiNbO_3$, after it is cut up into frequency conversion bars, may be about 12 mm long and 0.2 mm thick with a period of 9 μm providing a domain width of 4.5 μm. As an example, the applied voltage may be in the range of about 1 kV to about 10 kV or higher relative to plate thicknesses in the range of about 50 μm to 0.5 mm, with pulses having durations in the range of about 0.1 ms to about 10 ms, as previously indicated. As a more specific example, the voltage may be at least 2 kV for a crystal plate about 100 μm thick which is an applied voltage of 200 kV per centimeter. Such high voltage levels were not beneficially utilized previously until Webjorn et al. and Burns et al., supra. For a 7 mil thick crystal plate, $V_C$ is just below about 4 kV. The range of the applied electric field falls with several kV per cm to several 100 kV per cm, which is higher than previously anticipated in the prior art.

It is preferred that the E-field be applied in monotonically increasing voltage steps during the application of one or more pulses or during cw operation over a limited duration. For example, the first applied voltage step may be about 1 kV to insure that the circuit is properly behaving, i.e., that there are no electrode shorts or other malfunctions, and provide for any initial high voltage capacitive discharge, i.e., a capacitive spike, to occur. Then, the applied voltage is increased in incremental steps of about 2 kV, 3 kV, and 4 kV pulses. At this point, one or more 4 kV pulses may be applied in a manner illustrated in FIG. 10 to complete domain inversion of regions 84.

At the beginning of the first applied pulse, thin needle-shaped domains will appear in several places over the surface of crystal plate 10. These domains progress straight through the crystal to the opposite side thereby maintaining an orientation of the inverted domain walls parallel to the z axis of the crystal, which means that the formed walls have no charge and, therefore, are at a minimum energy level. From these nucleation points, the domains will grow sideways or laterally until the pattern representing the domain region is completely filled. If very narrow domains 84 are formed, i.e., domains of small periodicity, they can only propagate side by side over a relatively short lateral distance before they begin to merge or run together Thus the tolerable distance that is dependent on the grating period must be limited to a distance which, if exceeded, will bring about the merging or running together of domains in adjacently formed domains. Therefore, the width of the grating or pattern 85 is limited by the onset of this domain emerging process. At present, 8 μm wide (transverse) gratings relative to a 3 μm period grating are the best formed domains because the risk of the domains growing together is minimized due to the wider grating pattern. FIG. 8E illustrates the formed pattern of inverted domains 87 having a period according to the high frequency to be created via QPM second harmonic generation.

A more detailed explanation of the physical formation of inverted regions 84 is as follows. As the voltage is applied, the inversion generally extends first from the edges 89, particularly the end edges of the exposed regions 85 of pattern 80 on the z⁻ face. This is because the applied E-field is its strongest at electrode edges. In this case, the liquid electrode 86 is extending into the corner edges of the pattern where the E-field will be the strongest. As a result, the inversion will generally occur in these edge regions extending through the crystal bulk to the opposite liquid electrode 88 in thin needle-like domains, as mentioned above. Then, the inversion front now established through the crystal bulk will propagate laterally corresponding with exposed regions 85 of the gratings through which the E-field is applied, and extend in the y direction toward the center and opposite side of these exposed regions. This propagation laterally in the y plane within the crystal occurs at a slower rate than the initial propagation rate of the inversion through the crystal bulk in the z direction to opposing electrode 88. Soon the propagation of inversion will have extended across the full span of the surface of exposed regions 85 of the grating pattern. The formed inversion domains 84 will also slightly extend beneath edges of insulator mask or pattern 80 as illustrated in FIG. 8C.

The photoresist pattern 84 is not a perfect electrical isolator, which causes the electric field to spread under the edges of photoresist pattern 84. Therefore, the domains grow wider than the periodic spacing formed by the photoresist pattern. It is therefore, preferred to use narrowed openings between adjacent photoresist pattern stripes. As an example, the nominal width of the mask pattern in the spacings may be 0.7 $\mu$m, which is useful for domain periods down to about 2 $\mu$m. The 0.7 $\mu$m linewidth is the smallest feature size of our present photolithographic mask equipment. Therefore, even smaller line widths can be achieved with photolithographic mask equipment possessing even smaller feature sizes.

The limited RC time constant of photoresist pattern 84 isolating of crystal plate 10 from liquid electrodes 86, 88 results in the applied electric field spreading further with time. The conductivity is such that the electric field spreads beneath the edges of pattern 84 with a time constant on the order of several milliseconds. Therefore, the high voltage pulse duration should be limited to a millisecond range before the field extends beyond the pattern edges. As an example, the photoresist thickness may be on the order of 1.5 $\mu$m and the spacing between edges in the longitudinal direction may be about 0.7 $\mu$m. This can result in an about 2.3 $\mu$m longitudinally wide inverted domains 84 via respective exposed surfaces 85, depending, of course, on the total applied charge via multiple electric field pulses since a limited portion of the formed inversion will propagate beneath the edges of the photoresist pattern 80. For the case of an 0.2 mm thick LiNbO₃ crystal, four 2 ms pulses at peak voltages of 4 kV or higher completes the poling process for the above example.

As previously indicated, created domains tend to reinvert immediately as the applied E-field is switched off. The inverted domains need to be held in place for a time period in the range of about 1 ms to about 10 ms in order to become stabilized, i.e., the domains will fail to reinvert unless the crystal is subsequently subjected to either high temperatures approaching the Curie temperature of the crystal or to an applied high voltage field. Therefore, the impedance of the poling circuit shown in FIG. 10 is of paramount importance to a successful poling process. The dc high-voltage supply, HV, first charges capacitor 96. Then, device 90 pulses the voltage onto prepared LN crystal plate 10. A series resistor 92 of about 136 k$\Omega$ limits the current through LN crystal 10 and a parallel resistor 94 of about 800 M$\Omega$ provides a time constant of about 20 ms, which provides a holding voltage of sufficient duration to allow the inverted domains to stabilize. As shown in FIG. 10, a duration of about 5 ms to 15 ms should be sufficient.

In another aspect in the poling process of this embodiment, it should be noted that the timing of the pulses should be sufficiently long to eliminate any possibility of dielectric breakdown of photoresist pattern 84. We have found that if the photoresist pattern is applied to the z⁻ face, the tendency for such breakdown is further minimized.

In further aspect of the poling process of this embodiment, the lateral length in the y direction of inverted domains is dependent upon the domain period, i.e., the spacing provided between the domains and the duration of the applied pulses. If the total duration of applied field and charge on the crystal exceeds a given amount for a given domain spacing or grating period, the domains in the y or lateral direction will become wavy or nonuniform and merge toward one another. We have found that if the E-field is applied in a manner as disclosed in this embodiment, a laterally wavy inversion pattern merging longitudinally toward an adjacent inversion pattern in the x direction and connecting with an adjacent domain will not begin to appear for lateral lengths in excess of about 8 $\mu$m to 10$\mu$m relative to a 3 $\mu$m period grating comprising 1.5 $\mu$m longitudinally wide inversion domains 84 formed in a crystal plate 10 about 180 $\mu$m thick. Since the waveguide to be formed in the crystal should be about 4 $\mu$m wide (lateral length), the 8 $\mu$m expanse of uniform inverted domain inversion regions is sufficient for forming a nonlinear frequency conversion waveguide. Of course, for longer grating periods, the lateral dimension of the gratings can be correspondingly longer. Thus, the largest aspect ratio of grating period or domain width to crystal plate or medium thickness that can be achieved for practical application in this regard is about 1:500 or less. However, from a practical point of view, to fabricate plates with an aspect ratio greater than 1:200 is difficult because it becomes increasingly difficult to form the domains through a thicker substrate.

Another more refined but more expensive approach to control the formation of inverted domains 87 is the employment of a high voltage amplifier having a low impedance output. The amplifier can be operated to provide different shaped E-field applied pulses. One such example is a pulse shape having a first portion with a critical voltage above the coercive voltage of LN crystal 10, causing domain inversion, and a second portion having a voltage just below the coercive voltage of LN crystal 10, which is not sufficient for carrying on further inversion processes but is sufficient to hold the inverted domains sufficiently long enough, e.g., several ms, to permit their natural stabilization into their new inverted spontaneous polarization state.

The circuit of FIG. 10 may optionally include resistor 98, which may be of about 50 $\Omega$, for example, and is coupled between LN crystal 10 and ground. The voltage across resistor 98 is utilized by storage oscilloscope 99 to determine the amount of current flowing through LN crystal 10 for each applied E-field pulse. The integrated current trace provided by oscilloscope 99 provides the poling charge for each applied pulse, the total of which represents the total applied charge to the crystal plate. The poling process is terminated when an experimentally determined total target charge for a specific poling pattern 80 has been achieved. The total target charge is established through successive trial runs of E-field poling. For example, for lithium niobate, the unidirectional spontaneous polarization charge is 0.7 $\mu$C per mm$^2$. For LiTaO$_3$ and KTP, the charge per square mm is smaller than for lithium niobate; and for KTP, it is about one-tenth less. The total charge required for inversion is not dependent upon the thickness but rather on the total surface area of the crystal plate 10 to be inverted via patterned exposed surfaces 85. In order to achieve inversion in lithium niobate, therefore, it takes 0.7 $\mu$C per mm$^2$ charge to reduce spontaneous polarization to zero and another 0.7 $\mu$C per mm$^2$ charge to reverse or invert the spontaneous polarization. For a typical crystal plate 10, this may amount to as much as 5 $\mu$C requiring two pulses of 1 mA, each having a duration of 2.5 ms. In most cases it is preferred to employ two pulses or more rather than one long continuous pulse in order to exercise better control over the process and guard against the occurrence of unforeseen shorting and other malfunctions in the poling system as well as observe to some extent the progress of the domain inversion process without progressing to far causing undesirable domain inversion emergence.

After E-field poling, the liquid electrodes are easily peeled off the crystal plate and the photoresist pattern 80 is removed by conventional procedures, such as with propanol and acetone. Plate 10 is then rinsed and dried to remove water and LiCl residue from its surfaces.

Prior to the step of proton exchange to form a waveguide structure in crystal plate 10 inversion pattern 84, crystal strain, which has been introduced into the crystal plate during E-filed poling, needs to be relieved. This crystal strain is caused by the application of high voltages, i.e., in the range of several tens of kV per cm to several hundreds of kV per cm, which strain undesirably changes the refractive index properties of the crystal causing local birefringence. Strain relief renders the refractive index uniform again. Such relief is accomplished by annealing of the crystal prior to performing proton exchange to form a waveguide structure in the x direction as shown in FIG. 8E. Alternatively, strain relief can be accomplished concurrently with the proton exchange since the temperature during that process is sufficiently high to relieve the strain. However, as a precautionary measure, it is preferred to relieve the strain prior to fabrication of the waveguide. An example of this annealing step is the placement of crystal plate 10 in an annealing furnace for several hours, such as at least about two hours, at a temperature around 200° C.

Next, as illustrated in FIG. 8E, a waveguide 89 is formed in the crystal plate 10 along a central portion of the formed inversion pattern 84, which is one of the plurality of such patterns on plate 10, which patterns may have lengths of about 12 mm or so. The proper placement of waveguide 89 can be achieved in each of the inversion patterns employing the previously formed fiducial pattern. For simplicity, only one such waveguide 89 is shown here. The waveguides are formed according to proton exchange between lithium ions and hydrogen ions as is known in the art and taught in the disclosure of the article of Ka-Kha Wong entitled, "Integrated Optical Waveguides and Devices Fabricated by Proton Exchange: A Review", *SPIE—Proceedings of the Integrated Optical Circuit Engineering VI*, Vol. 993, pp. 13–25 (1988), which is incorporated herein by reference thereto. First, the z$^-$ face is selectively masked to form an exposed elongated region dissecting transversely, in particular perpendicular an substantially central of the formed inversion pattern. The masking material may be a metal, such as, Ti, Cr or Al, or may be a dielectric material such as SiO$_2$. The process is carried out by employing a lithium-rich benzoic acid melt to provide for lithium-hydrogen exchange in the exposed patterned regions to form a waveguide having a higher refractive index than the remaining area of the lithium niobate crystal covered by the mask. The depth of the waveguide is determined by the amount of time over which the exchange takes place and may be applied for a sufficient duration to achieve a depth of less than one $\mu$m, such as 0.5 $\mu$m, to several microns.

As indicated above, the strain relief may be carried out during this step because the proton exchange is carried out at a higher temperature of about 160° C., which is sufficient to bring about relief if the time period of proton exchange is sufficiently long.

After completion of the proton exchange, the individual frequency conversion waveguide structures are cut from plate 10 using a diamond saw and the longitudinal end facets of each individual device are polished as is conventional in the art.

Although the invention has been described in conjunction with one or more preferred embodiments, it will be apparent to those skilled in the art that other alternatives, variations and modifications will be apparent in light of the foregoing description as being within the spirit and scope of the invention. Thus, the invention described herein is intended to embrace all such alternatives, variations and modifications that fall within the spirit and scope of the invention.

What is claimed is:

1. A method of forming periodic inverted domains in a nonlinear medium comprising the steps of:

forming spatially, disposed, regions on a first major surface of the nonlinear medium replicating the periodicity desired for the inverted domains;

forming a region on an opposite second major surface of the nonlinear medium; and applying a high voltage electric field for inverted domains resulting in a pattern of continuously alternating domains through the bulk thickness of the medium;

the improvement comprising the step of controlling the rate discharge of stored voltage remaining on the nonlinear medium due to the applied electric field to prevent domain reversal of the formed inverted domains.

2. The method of claim 1 wherein the step applying the electric field is carried out at a temperature in the range of about 0° C. to about 100° C.

3. The method of claim 1 wherein the step applying the electric field is carried out around room temperature.

4. The method of claim 1 wherein the formed regions on said first major surface are formed by sensitizing regions of the crystal on the first major surface so as to be unaffected by the applied electric field.

5. The method of claim 1 wherein the formed regions on said first major surface are created by applying a liquid electrode pattern on the first major surface replicating the periodicity desired for the inverted domains.

6. The method of claims 5 wherein the liquid electrode pattern comprises a moisturized conductive medium.

7. The method of claim 6 wherein said moisturized conductive medium comprises conductive filter paper soaked in a solution of LiCl mixed in water.

8. The method of claim 5 wherein the region on the second major surface of the medium comprises a liquid electrode.

9. The method of claim 8 wherein the liquid electrodes comprise a moisturized conductive medium.

10. The method of claim 9 wherein said moisturized conductive medium comprises conductive filter paper soaked in a solution of LiCl mixed in water.

11. The method of claim 5 wherein the formed regions on said first major surface are created by first forming a pattern of insulating regions on the first major surface replicating the periodicity desired for the inverted domains; and applying a liquid electrode over the insulating region pattern.

12. The method of claim 11 wherein the liquid electrode comprises a moisturized conductive medium.

13. The method of claim 12 wherein said moisturized conductive medium comprises conductive filter paper soaked in a solution of LiCl mixed in water.

14. The method of claim 11 comprising the further steps of:

applying a plurality of pulses to apply the electric field; and timing the sequential application of the pulses to prevent dielectric breakdown of the insulating pattern.

15. The method of claim 1 wherein the medium comprises $LiNbO_3$, $LiTaO_3$ or KTP.

16. The method of claim 1 wherein the step of applying an electric field comprises at least one applied voltage pulse.

17. The method of claim 1 wherein the step of applying an electric field comprises applying a plurality of pulses each having a duration in the range of about 0.1 ms to about 10 ms.

18. The method of claim 17 wherein the electric field pulses are consecutively applied with increased voltage.

19. The method of claim 17 comprising the further step of timing the sequential application of the pulses to prevent dielectric breakdown.

20. The method of claim 1 wherein the first major surface comprises either $z^-$ or $z^+$ face of the nonlinear medium.

21. The method of claim 1 comprising the further step of annealing the medium to relieve the medium of any crystal strain during the step of electric field application.

22. The method of claim 21 wherein the step of annealing is carried out at a temperature around 200° C. for at least two hours.

23. The method of claim 1 wherein an aspect ratio of formed domains to medium thickness is about 1:200 or less.

24. A nonlinear crystal medium for frequency conversion formed according to the method of claim 1.

25. A light frequency converter system comprising a nonlinear crystal medium formed according to the method of claim 1.

26. The method of claim 1 wherein the step of applying a high voltage electric field comprises an electric field in the range of about several kilovolts per centimeter to about several 100 kilovolts per centimeter.

27. A nonlinear frequency conversion device for quasi-phase matching of an input radiation beam having a nonlinear medium fabricated according to the method of claim 1.

28. The device of claim 27 wherein the nonlinear medium comprises $LiNbO_3$, $LiTaO_3$ or KTP.

29. The device of claim 27 wherein the nonlinear medium comprises a polymeric medium.

30. A method of forming periodic inverted domains in a nonlinear medium comprising the steps of:

forming spatially, disposed, regions on a first major surface of the nonlinear medium replicating the periodicity desired for the inverted domains;

forming a region on an opposite second major surface of the nonlinear medium; and applying a high voltage electric field for forming inverted domains resulting in a pattern of continuously alternating domains through the bulk thickness of the medium;

the formed regions on said first major surface being formed by photovoltaic type of reaction with the applied electric field.

31. The method of claim 30 wherein the photovoltaic type of reaction is established by an radiation beam applied to the first major surface.

32. The method of claim 30 wherein the photovoltaic type of reaction is established by an interference pattern through at least two applied radiation beams applied to the first surface.

33. A method of forming periodic inverted domains in a nonlinear medium comprising the steps of:

forming spatially disposed, regions on a first major surface of the nonlinear medium replicating the periodicity desired for the inverted domains, forming a region on an opposite second major surface of the nonlinear medium;

applying a high voltage electric field for forming inverted domains resulting in a pattern of continuously alternating domains through the bulk thickness of the medium;

the improvement comprising the step of moving an edge electrode across the first major surface while applying a periodic applied electric field to establish the formed regions on said first major surface.

34. The method of claim 33 wherein the step of applying a high voltage electric field comprises an electric field in the range of about several kilovolts per centimeter to about several 100 kilovolts per centimeter.

35. A nonlinear frequency conversion device for quasi-phase matching of an input radiation beam having a nonlinear medium fabricated according to the method of claim 33.

36. The device of claim 35 wherein the nonlinear medium comprises $LiNbO_3$, $LiTaO_3$ or KTP.

37. The device of claim 35 wherein the nonlinear medium comprises a polymeric medium.

38. A method of forming periodic inverted domains in a nonlinear medium comprising the steps of:

forming spatially, disposed, regions on a first major surface of the nonlinear medium replicating the periodicity desired for the inverted domains;

forming a region on an opposite second major surface of the nonlinear medium;

applying a high voltage electric field for forming inverted domains resulting in a pattern of continuously alternating domains through the bulk thickness of the medium;

the improvement comprising the step of applying an acoustic field across the first major surface to set up the periodicity desired for the inverted domains and applying the electric field to establish the formed regions on said first major surface.

39. The method of claim 38 wherein the step of applying a high voltage electric field comprises an electric field in the range of about several kilovolts per centimeter to about several 100 kilovolts per centimeter.

40. A nonlinear frequency conversion device for quasi-phase matching of an input radiation beam having a nonlinear medium fabricated according to the method of claim 38.

41. The device of claim 40 wherein the nonlinear medium comprises $LiNbO_3$, $LiTaO_3$ or KTP.

42. The device of claim 40 wherein the nonlinear medium comprises a polymeric medium.

43. A method of forming periodic inverted domains in a nonlinear medium comprising the steps of:

forming spatially, disposed domain regions on a first major surface of the nonlinear medium by creating a pattern of inversion preventing regions relative to the first major surface between which the domain regions are to be formed;

applying a liquid electrode to the inversion preventing region pattern;

applying a liquid electrode to an opposite second major surface of the nonlinear medium; and applying a high voltage electric field having a voltage in the range of about several kilovolts per centimeter to about several 100 kilovolts per centimeter forming inverted domains in the domain regions resulting in a pattern formed through the medium of continuously alternating domains;

the improvement comprising the step of applying multiple high voltage pulses with increased voltage per pulse to reduce the risk of dielectric breakdown.

44. The method of claim 43 wherein the step applying the electric field is carried out at a temperature in the range of about 0° C. to about 100° C.

45. The method of claim 43 wherein the step applying the electric field is carried out around room temperature.

46. The method of claim 43 further maintaining the voltage a sufficient time period after pulse termination to cause stabilization of domain region formation.

47. The method of claim 46 wherein the time period is in the range of about 1 ms to about 15 ms.

48. The method of claim 46 wherein the voltage monotonically decreases during the time period.

49. The method of claim 43 wherein the pattern of domain regions is applied to a z⁻ surface of the nonlinear medium.

50. The method of claim 49 wherein the nonlinear medium comprises $LiNbO_3$, $LiTaO_3$ or KTP.

51. The method of claim 43 wherein the liquid electrode pattern comprises a moisturized conductive medium.

52. The method of claim 51 wherein said moisturized conductive medium comprises conductive filter paper soaked in a solution of LiCl mixed in water.

53. The method of claim 43 wherein the nonlinear medium comprises $LiNbO_3$, $LiTaO_3$ or KTP.

54. The method of claim 43 further comprising the step of relieving medium strain after high voltage electric field pulse application.

55. The method of claim 54 wherein the step of relieving medium strain comprises the step of annealing the nonlinear medium.

56. The method of claim 55 wherein the annealing step is carried out around 200° C. for at least two hours.

57. The method of claim 43 wherein the aspect ratio of the domain region to medium thickness does not exceed 1:200.

58. The method of claim 43 wherein the step of applying an electric field comprises applying a plurality of pulses.

59. The method of claim 58 wherein the electric field pulses are consecutively applied with increased voltage.

60. The method of claim 58 wherein the electric field pulses each have a duration in the range of about 0.1 ms to about 10 ms.

61. The method of claim 58 comprising the further step of timing the sequential application of the pulses to prevent dielectric breakdown.

62. A nonlinear frequency conversion device for quasi-phase matching of an input radiation beam or beams having a nonlinear medium fabricated according to the method of claim 43.

63. The device of claim 62 wherein the nonlinear medium comprises $LiNbO_3$, $LiTaO_3$ or KTP.

64. The device of claim 62 wherein the nonlinear medium comprises a polymeric medium.

65. The device of claim 62 wherein a semiconductor laser, semiconductor laser array, fiber laser or fiber laser array is a source of said beam or beams.

66. A method of forming periodic inverted domains in a nonlinear medium comprising the steps of:

forming spatially, disposed domain regions on a first major surface of the nonlinear medium by creating a pattern of inversion preventing regions relative to the first major surface between which the domain regions are to be formed;

applying a liquid electrode to the inversion preventing region pattern;

applying a liquid electrode to an opposite second major surface of the nonlinear medium;

applying a high voltage electric field for forming inverted domains resulting in a pattern of continuously alternating domains through the bulk thickness of the medium; and controlling the rate of discharge of stored voltage remaining on the nonlinear medium due to the applied electric field to prevent domain reversal of the formed inverted domains.

67. The method of claim 66 wherein the step of applying a high voltage electric field comprises an electric field in the range of about several kilovolts per centimeter to about several 100 kilovolts per centimeter.

68. A nonlinear frequency conversion device for quasi-phase matching of an input radiation beam having a nonlinear medium fabricated according to the method of claim 66.

69. The device of claim 68 wherein the nonlinear medium comprises $LiNbO_3$, $LiTaO_3$ or KTP.

70. The device of claim 68 wherein the nonlinear medium comprises a polymeric medium.

71. The method of claim 66 wherein the step of applying an electric field comprises applying a plurality of pulses.

72. The method of claim 71 wherein the electric field pulses are consecutively applied with increased voltage.

73. The method of claim 71 wherein the electric field pulses have a duration in the range of about 0.1 ms to about 10 ms.

74. The method of claim 71 comprising the further step of timing the sequential application of the pulses to prevent dielectric breakdown.

75. The method of claim 66 wherein the pattern of domain regions is applied to a z⁻ surface of the nonlinear medium.

76. The method of claim 66 wherein the nonlinear medium comprises $LiNbO_3$, $LiTaO_3$ or KTP.

77. A method of forming periodic inverted domains in a nonlinear medium comprising the steps of:

forming spatially, disposed, regions on a first major surface of the nonlinear medium replicating the periodicity desired for regions of formed inverted domain to be formed therebetween;

forming a region on an opposite second major surface of the nonlinear medium;

applying at least one high voltage electric field pulse to cause domain reversal forming the inverted domain regions;

maintaining the duration of the at least one pulse a sufficient period of time to allow stabilization of the formed reverse domain regions; and controlling the rate discharge of stored voltage remaining on the nonlinear medium due to the at least one applied electric field pulse to prevent domain reversal of the formed inverted domains.

78. The method of claim 77 wherein said period of time is in the range of about 1 ms. to about 15 ms.

79. The method of claim 77 wherein the step of applying a high voltage electric field comprises an electric field in the range of about several kilovolts per centimeter to about several 100 kilovolts per centimeter.

80. A nonlinear frequency conversion device for quasi-phase matching of an input radiation beam having a nonlinear medium fabricated according to the method of claim 77.

81. The device of claim 80 wherein the nonlinear medium comprises $LiNbO_3$, $LiTaO_3$ or KTP.

82. The device of claim 80 wherein the nonlinear medium comprises a polymeric medium.

83. The method of claim 77 wherein the step of applying an electric field comprises applying a plurality of pulses.

84. The method of claim 83 wherein the electric field pulses are consecutively applied with increased voltage.

85. The method of claim 83 wherein the electric field pulses have a duration in the range of about 0.1 ms to about 10 ms.

86. The method of claim 83 comprising the further step of timing the sequential application of the pulses to prevent dielectric breakdown.

87. The method of claim 77 wherein the pattern of domain regions is applied to a $z^-$ surface of the nonlinear medium.

88. The method of claim 77 wherein the nonlinear medium comprises $LiNbO_3$, $LiTaO_3$ or KTP.

* * * * *